E. BALBACH, Jr.
Separating Zinc from Gold and Silver.
No. 5,461. Reissued June 24, 1873.
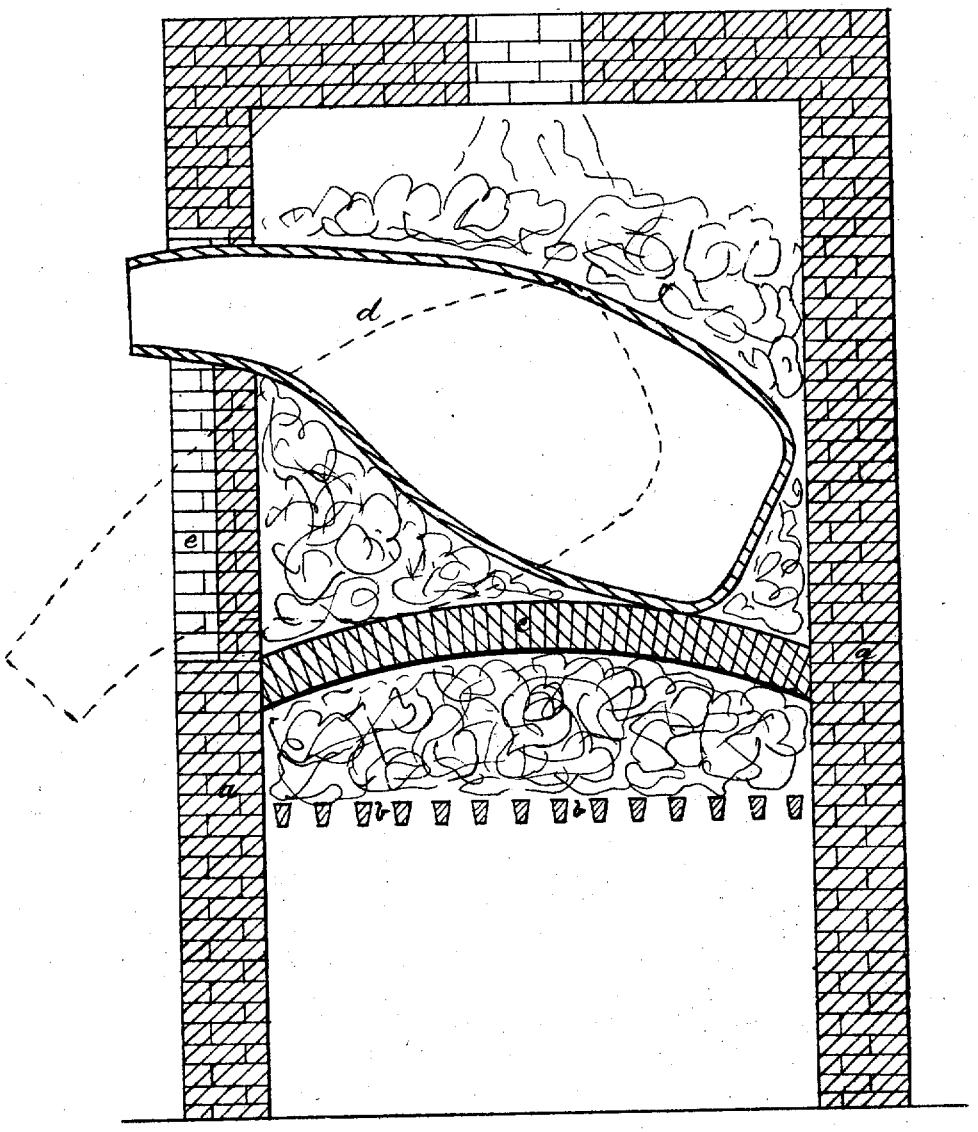
Witnesses.
J. B. L. Coonley
J. E. Lathrop
Inventor
Edward Balbach Jr.
By his attys
Drake & Co
AM. PHOTO-LITHOGRAPHIC CO. N.Y. (OSBORNE'S PROCESS.)

UNITED STATES PATENT OFFICE.

EDWARD BALBACH, JR., OF NEWARK, NEW JERSEY.

IMPROVEMENT IN SEPARATING ZINC FROM GOLD AND SILVER.

Specification forming part of Letters Patent No. 64,934, dated May 21, 1867; reissue No. 5,461, dated June 24, 1873; application filed June 7, 1873.

*To all whom it may concern:*

Be it known that I, EDWARD BALBACH, Jr., of the city of Newark, in the county of Essex and State of New Jersey, have invented certain new and useful Improvements in Separating Zinc from Gold and Silver; and I do hereby declare that the following is a full, clear, and exact description thereof that will enable others skilled in the art to which it appertains to make and use the same, reference being had to the accompanying drawing and to the letters of reference marked thereon which form a part of this specification.

Gold and silver are often found in galena, and it is common to introduce lead for the separation of gold and silver from pyrites, and afterward to employ zinc for concentrating the lead and precious metals. In separating the zinc from the gold, silver, and lead alloy it has been usual to distill the zinc and condense the same in a receiver; but difficulty has arisen in removing the lead, gold, and silver from the retort for subsequent assay and refining, because such retort was a fixture and made of clay, and in case of injury from the heat the contents could not be quickly emptied, but ran into the fire, often involving considerable loss; hence such fixed retorts were seldom used a second time after being cooled, because of the risk of breaking.

The nature of my said invention consists in the construction of a black-lead retort, with a neck placed in a furnace in such a manner that it can be turned up for the reception of alloy of gold, silver, lead, and zinc, while the latter is distilled off by the heat and condensed, and then turned down to empty out the precious metals with the alloy or impurities to be subsequently refined. The retort is then turned up to its place and recharged; or, if preferred, the retort may be stationary in the furnace, and the furnace is so constructed as to tilt, thus accomplishing the same result.

This construction greatly facilitates the separation of the zinc, and avoids delays resulting from emptying the retorts heretofore employed, and prevents the risk of loss by breaking, which has heretofore been usual with the fixed clay retorts.

In the drawing, *a a* are the walls of a furnace of any desirable size. *b b* are the grate-bars. *c* is a bridge, or bearer, of fire-brick, made narrow, so that the coals may be packed at the sides of it, and also at the sides of the retort *d*, that is formed with a neck at one end, and rests upon the said bearer *c*. The front of the furnace is provided with an opening at *e*, through which the neck of the retort *d* projects, and this opening is sufficiently long to allow the retort to be turned down from the position shown in black lines to that shown in red lines; and when the retort is in use this opening is to be filled by a block of fire-brick, or by separate fire-bricks introduced beneath the neck of the retort *d*, which also hold the same up during the distillation of the zinc, which is driven off from the mass of metal introduced within the retort. The zinc is to be received and condensed in any suitable chamber connected to the neck of the retort, and when the zinc has been distilled off, the space *e* may be opened and the retort turned down, to pour out the alloy of gold, silver, and lead in the concentrated form in which this process leaves the same.

The fuel is to be supplied through a suitable opening over the retort, and the products of combustion may be taken from the same place to a chimney. Two of these retorts may be inserted side by side in the same fire, using one condensing-chamber.

What I claim as new, and desire to secure by Letters Patent, is—

A black-lead retort, arranged within a furnace, substantially as described, so that it can be turned up for the reception of the alloy, and for distilling off the zinc, and then turned down to empty it of its contents, as and for the purpose herein described.

In testimony that I claim the foregoing I have hereunto set my hand this 5th day of June, 1873.

EDWARD BALBACH, JR.

Witnesses:
OLIVER DRAKE,
DAVID COLLINS.